United States Patent [19]
Yamada et al.

[11] Patent Number: 5,541,238
[45] Date of Patent: Jul. 30, 1996

[54] FIBERS COMPRISING ULTRAFINES UNIFORMLY DISPERSED AND DEPOSITED THEREON

[75] Inventors: Yukiyoshi Yamada; Tadashi Fuyuki, both of Saitama-ken; Eisuke Kuroda; Satoshi Akiyama, both of Kawagoe; Naoto Tonoike, Saitama-ken; Kaoru Umeya, 1-30-13, Yagiyamahon-cho, Taihaku-ku, Sendai-shi, Miyagi-ken; Kazunobu Ogawa, Tokyo; Kazuya Miyazaki, Tokyo; Hitoshi Nagasaka, Tokyo, all of Japan

[73] Assignees: Nisshin Flour Milling Co., Ltd., Tokyo; Kaoru Umeya, Sendai; Ryobi Limited, Fuchu, all of Japan

[21] Appl. No.: 131,964

[22] Filed: Oct. 8, 1993

[30] Foreign Application Priority Data

Oct. 9, 1992 [JP] Japan ................................. 4-296575

[51] Int. Cl.⁶ ................................. C08K 9/00
[52] U.S. Cl. ................. 523/200; 523/220; 523/222; 524/404; 524/440; 524/439; 524/441; 524/443; 524/494; 524/496; 524/452; 525/935
[58] Field of Search ................. 428/372, 367, 428/366, 375, 389, 380, 387, 323; 523/212, 213, 200, 204, 215, 217, 512, 220, 222; 524/495, 496, 452, 453, 454, 455; 525/DIG. 935

[56] References Cited

U.S. PATENT DOCUMENTS

| | | | |
|---|---|---|---|
| 3,869,335 | 3/1975 | Siefert | 65/3 |
| 4,522,873 | 6/1985 | Akagi et al. | 428/283 |
| 5,047,281 | 9/1991 | Betz et al. | 428/201 |
| 5,206,085 | 4/1993 | Nakagawa et al. | 428/372 |
| 5,217,778 | 6/1993 | LaCasse | 428/364 |
| 5,230,951 | 7/1993 | Birchall et al. | 428/372 |
| 5,240,770 | 8/1993 | Moriga et al. | 428/372 |

FOREIGN PATENT DOCUMENTS

| | | |
|---|---|---|
| 366234 | 5/1990 | European Pat. Off. . |
| 60-094488 | 5/1985 | Japan . |
| 60-239519 | 11/1985 | Japan . |
| 3145479 | 6/1988 | Japan . |
| 5-117965 | 5/1993 | Japan . |

*Primary Examiner*—Patrick J. Ryan
*Assistant Examiner*—Jill M. Gray
*Attorney, Agent, or Firm*—Oblon, Spivak, McClelland, Maier & Neustadt, P.C.

[57] ABSTRACT

Disclosed is a fiber of an organic, inorganic or metallic material or a simple substance wherein ultrafines of an inorganic or metallic material or a simple substance having an average particle diameter of 0.005–1 μm are uniformly dispersed and deposited on 8–90% of the surface in a single layer. The fiber is produced by exposing a fiber of an organic, inorganic or metallic material or a simple substance to a gaseous stream forming ultrafines of an inorganic or metallic material or a simple substance by a vapor phase process, thereby contacting said ultrafines in the gaseous stream with said fiber in a state wherein the ultrafines are still active. The treated fiber is useful as a reinforcing material for a fiber reinforced composite.

11 Claims, 3 Drawing Sheets

FIBERS COMPRISING ULTRAFINES UNIFORMLY DISPERSED AND DEPOSITED THEREON

FIELD OF THE INVENTION

This invention relates to fibers of an organic, inorganic or metallic material or a simple substance, on the surface of which are deposited ultrafines of an inorganic or metallic material or a simple substance and to processes of preparing such fibers. The invention further relates to processes of preparing a fiber reinforced composite using such fibers.

BACKGROUND OF THE INVENTION

Fibrous materials which include fibers of organic materials such as polyester, polyamide and polyimide; fibers of inorganic materials such as glass, silicon carbide, asbestos, rock wool; and fibers of a simple substance such as carbon have been used as a reinforcing material in the manufacture of a fiber reinforced composite. They are blended or coated with a liquid thermosetting resin, or milled with said resin and molded into a fiber reinforced composite by suitable molding means including compression, transfer, injection, extrusion or lamination with other sheet materials. In that case, however, the surface of the reinforcing material is often smooth, which results in insufficient adhesion to the thermosetting resin. Thus, there was a problem that smooth surface of the reinforcing material gives unsatisfactory strength of molded products.

SUMMARY OF THE INVENTION

In view of the problem of the prior art, we have investigated the reinforcing materials in the manufacture of the fiber reinforced composites and found that fibers of an organic, inorganic or metallic material or a simple substance comprising ultrafines of an inorganic, metallic material or a simple substance deposited thereon provide improved bonding property with the fiber reinforced composites due to micro anchor effect of ultrafines between the fibers and binder resins or adhesives.

It is an object of the present invention to provide fibers of an organic, inorganic or metallic material or a simple substance comprising ultrafines of an inorganic or metallic material or a simple substance deposited thereon, which are useful as a reinforcing material for a fiber reinforced composite or a reinforced resin and as a treated fiber having good adhesion property.

Another object of the invention is to provide a process of preparing said fibers by a vapor phase process.

A further object of the invention is to provide a fiber reinforced composite comprising said fibers and at least one of a thermosetting resin and a thermoplastic resin.

DETAILED DESCRIPTION OF THE INVENTION

Figure 1:
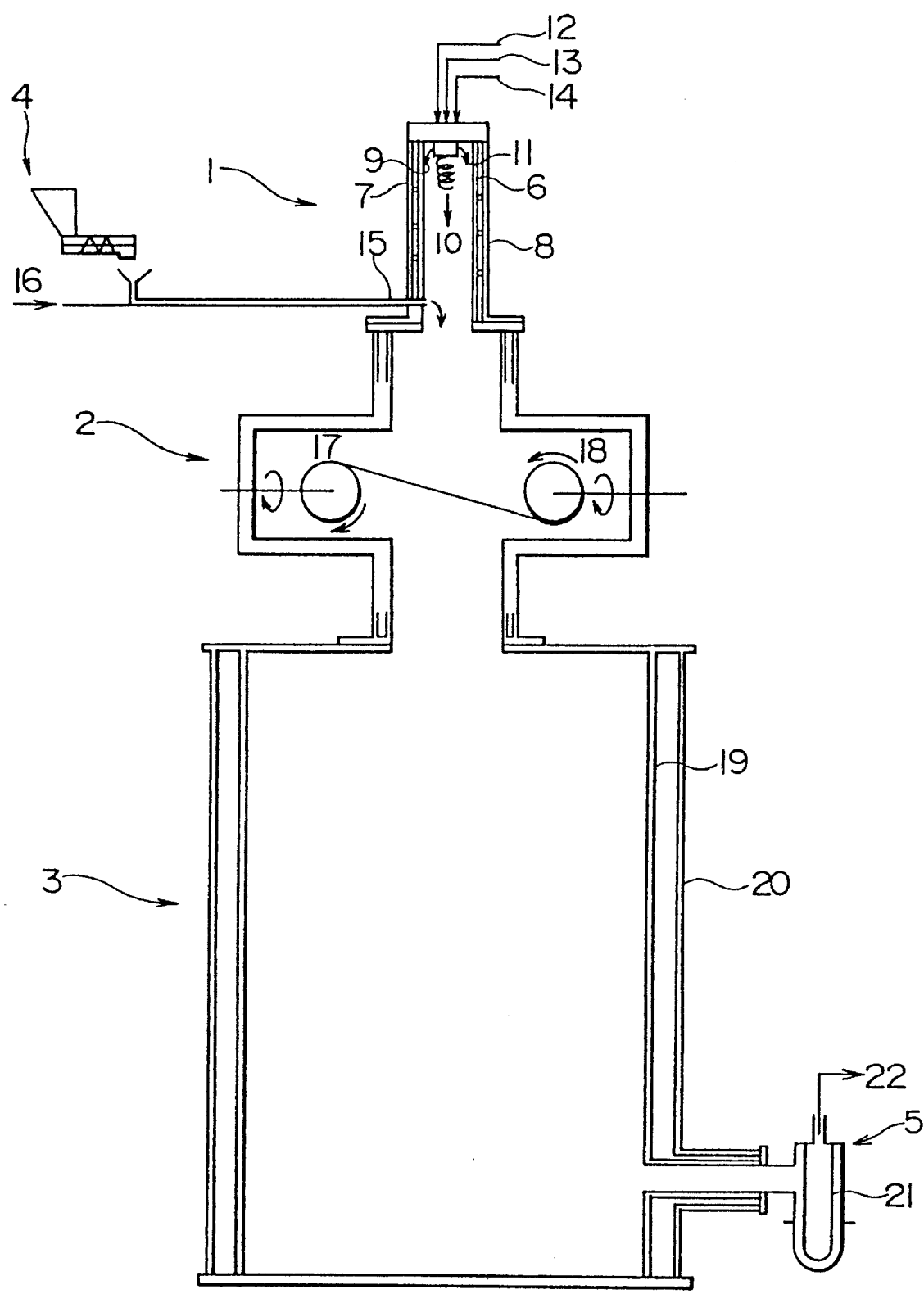
FIG. 1 is a schematic illustration of an apparatus adapted to produce the fibers comprising the ultrafines deposited thereon.

According to the present invention, there is provided a fiber of an organic, inorganic or metallic material or a simple substance which ultrafines of an inorganic or metallic material or a simple substance having an average particle diameter of 0.005–1 µm are uniformly dispersed and deposited on 8–90% of the surface in a single layer.

The invention also provides a process of preparing a fiber of an organic, inorganic or metallic material or a simple substance which ultrafines of an inorganic or metallic material or a simple substance having an average particle diameter of 0.005–1 µm are uniformly dispersed and deposited on 8–90% of the surface in a single layer, which comprises exposing a fiber of an organic, inorganic or metallic material or a simple substance to a gaseous stream forming ultrafines of an inorganic or metallic material or a simple substance by a vapor phase process, thereby contacting said ultrafines in the gaseous stream with said fiber in a state wherein the ultrafines are still active.

The invention further provides a fiber reinforced composite comprising a fiber of an organic, inorganic or metallic material or a simple substance wherein ultrafines of an inorganic or metallic material or a simple substance having an average particle diameter of 0.005–1 µm are uniformly dispersed and deposited on 8–90% of the surface in a single layer and at least one of a thermosetting resin and a thermoplastic resin.

The generic term "fiber" as defined herein includes monofilament, staple fiber, textile, fabric or the like. The term "simple substance" refers to a matter consisting of atoms of one type.

In one embodiment, the fiber of an organic, inorganic or metallic material or a simple substance is fed continuously or semi-continuously at a suitable rate to a gaseous stream forming ultrafines of an inorganic or metallic material or a simple substance by a vapor phase process, e.g. by a Chemical Vapor Deposition (CVD) or a Physical Vapor Deposition (PVD) such as a Radio Frequency Plasma process (RF) and laser process. The vapor phase process by CVD includes utilizing a chemical reaction to chemically produce ultrafines. The process by PVD (including RF plasma) includes subjecting the material to a suitable physical condition (e.g. heating the material by any heat source, introducing the material into an atmosphere at elevated temperature) to form the material into a gaseous state and cooling the gaseous material for condensation to produce ultrafines. Both processes are adapted to obtain ultrafines by solidifying the material in a condition of intact ultrafines (0.001–0.1 µm, diameter) before formation of a large particle due to aggregation by impingement and contact between particles during the formation of particle. In general, lower internal pressure of a reaction vessel can produce ultrafines of smaller particle size. CVD and PVD in a condition of an elevated degree of vacuum have been employed for a thin film coating onto a substrate, but a rate of film formation is very slow. RF plasma process includes utilizing a high-temperature plasma at about 10000° C. to continuously produce ultrafines. Even if the ultrafines thus produced, carrying on a gas stream are merely brought into contact with a fiber, ultrafines are not deposited firmly on the surface of the fiber.

In the process of the present invention, the fiber to be treated is fed to an area forming ultrafines in a gaseous stream, while forming ultrafines by the CVD or PVD process, in particular RF plasma process, whereby ultrafines are firmly deposited on the surface of the fiber. The time leading from the formation of ultrafines to the contact with the fiber and the contact time are instantaneous and do not exceed one second. A contact time of the ultrafines with the fiber can be decided suitably, depending upon the desired degree of deposition of the ultrafines and the nature of the materials. Preferably, the contact of ultrafines with the fiber is conducted by moving the fiber at a suitable rate.

The materials of fibers which can be used in the invention include organic materials, e.g. polyester, polyimide, polyphenylsulfide or the like; inorganic materials, e.g. glass, asbestos, rock wool, silicon carbide or the like; metallic materials, e.g. fine wires or filaments of Fe, Ni, Al, Ti, Au, Ag, W or the like; and single substances, e.g. carbon fiber or its woven fabric or the like.

The materials of the ultrafines include any suitable inorganic, metallic materials and simple substances, which may be identical with or different from those of fibers, depending upon the nature and function desired for the fibers comprising the ultrafines dispersed and deposited thereon, examples of which include inorganic oxides such as $Al_2O_3$, $SiO_2$, $ZrO_2$, $Y_2O_3$, CaO or the like; nitrides such as $Si_3N_4$, AlN, BN, TiN or the like; carbides such as SiC, WC, TiC or the like; borides such as BP, BN or the like; metals such as Si, Al, Ni, Co, Cu, Fe, Ti, W or the like; intermetallic compounds and alloys of those metals; composite materials thereof; and a simple substance such as C, B or the like.

The ultrafines which are uniformly dispersed and deposited on the fiber have an average particle diameter of 1 μm or less, usually 0.1 μm or less. For that purpose, the ultrafines of 0.005–1.0 μm are effective.

The ultrafines of inorganic or metallic materials or a simple substance can be formed by known means, for example, physical means such as arc-discharge plasma jet, arc dissolution, radio-frequency plasma, gas evaporation .or chemical means such as reduction or oxidation of vapor of inorganic or metallic materials.

In the practice of the invention, the fibers of organic, inorganic or metallic materials or a simple substance are exposed by any means to a gaseous stream forming the ultrafines of inorganic or metallic materials or a single substance in the above manner, whereby those ultrafines are contacted with those fibers in a state wherein the ultrafines are still active. In that case, the ultrafines are as formed by the vapor phase process including physical or chemical means, which refers to "in a nascent state" or in an activated state containing a free radical, i.e. "in a state wherein the ultrafines are still active" as defined herein. Without being bound to any particular theory, when the ultrafines are being contacted with the fibers, they will be covalently bonded to the fibers, by which both are chemically bonded together strongly.

The fiber to be contacted with the ultrafines is moved in a single fiber or multiple fibers through a gaseous stream forming the ultrafines in a direction substantially perpendicular to the stream. This fiber may be bundled or unbundled. The proportion and area of the ultrafines deposited can be varied by changing a rate of movement of the fibers, e.g. a take-up rate of the treated fiber. The ultrafines deposited are uniformly dispersed or distributed on the substantially whole surface of the fibers. Even if the fibers are moved in the state of the bundle, the ultrafines are sufficiently deposited to the interior of the fiber bundle. The ultrafines may be deposited in a manner of bonding in a substantially spherical form and may be deposited in a manner of weld bonding in a semi-spherical form, depending on the wettability of the material of the particles to be deposited on the fiber. In either case or in the case of its intermediate bonding manner, the fiber reinforcing material for the fiber reinforced composite intended in the present invention can be obtained. If a rate of formation of the ultrafines by a vapor phase process is constant, the proportion of the ultrafines deposited can be controlled by controlling a rate of movement of the fiber.

A proportion of the ultrafines deposited on the surface of the fibers can be varied, depending on the nature and function desired for the treated fibers. Thus, a degree of deposition is favorably 8–90%, preferably 25–60% for the reinforcing fibers for the manufacture of the fiber reinforced composite. If a degree of deposition is more than 90%, a substantially whole surface of the fiber is covered with the ultrafines, which results in loss of an anchor effect. If a degree of deposition is in the range of 1–7%, a reinforcing effect is obtained in its own way, but no satisfactory function is displayed. A degree of deposition as defined herein is expressed as a ratio of a projected area of the ultrafines deposited on a unit surface of the fiber. The degree of deposition is determined from an average diameter of the deposited ultrafines and the diameter of the fiber to be deposited.

According to the present invention, there are produced the fibers of organic materials, e.g. MXD (polyamide of methaxylylene diamine and adipic acid), HT-1 (polyamide of 1,3-diaminobenzene and isophthalic acid), QUIANA®, ARAMID fiber, the fibers of inorganic materials e.g. glass fiber, silicon carbide fiber, rock wool and the fibers of a simple substance, e.g. PAN type carbon fiber, pitch type carbon fiber, on 8–90% of the surface of which are deposited e.g. glass ultrafines, carbon ultrafines, $Al_2O_3$ ultrafines, Al ultrafines, SiC ultrafines, Ti ultrafines, TiN ultrafines, TiC ultrafines or the like.

The fibers comprising said ultrafines deposited thereon, i.e. the treated fibers can be incorporated in or coated with a liquid thermosetting resin or milled with a liquid thermosetting resin to form a composite matrix. If the matrix is molded by suitable molding means, an adhesion between the fiber and the thermosetting resin is remarkably improved by deposition of the ultrafines on the fiber. The strength of the resultant fiber reinforced composite is 1.2–1.5 times greater than that of the composite using the fiber not comprising the deposited ultrafines as a reinforcing material. A degree of deposition of 8–90% is satisfactory for that purpose.

In the present invention, the ultrafines (0.005–1 μm) firmly deposited in a single layer on 8–90% of the surface of the fiber can provide a protrusion on an effective surface for a micro anchor effect. This can increase a chemical bond of a composite matrix and also improve a physical anchor effect to the matrix, by which the physical properties of the molded product are more improved.

The liquid thermosetting resins used herein include all thermosetting resins conventionally used in the art for the manufacture of the fiber reinforced composite or fiber reinforced plastic (FRP), e.g. unsaturated polyester, phenol-formaldehyde precondensate, epoxy resin composition, polyurethane resin composition or the like. In the production of the fiber reinforced composite using the treated fiber of the present invention, there can be employed any processes known in the art.

Alternatively, the treated fiber of the present invention can be combined with a thermoplastic resin to form a fiber reinforced composite material. The molded product of the fiber reinforced composite material can be produced by incorporating a staple fiber in a thermally plasticized resin, milling and molding by a suitable molding process such as casting or by casting a plasticized resin onto the treated fiber and molding by any means such as rolling or by compression molding of the fiber or fabric and a particulate or powdered resin. The thermoplastic resins used include polyolefins, e.g. polyethylene, polypropylene, polystyrene, polyacrylate, polymethacrylate, polyvinyl chloride, polytetrafluoroethylene, polytrifluorochloroethylene, polyisoprene, polybutadiene, SBR, natural rubber or the like.

The invention will be illustrated by the following examples.

EXAMPLE 1

This example illustrates the production of carbon fiber comprising glass ultrafines deposited thereon using an apparatus as schematically illustrated in FIG. 1. As the carbon fiber to be treated in this example is employed Besfight HTA-12K manufactured by Toho Rayon Co., Ltd.

The apparatus used herein comprises a plasma torch 1, a chamber 3, a fine particle feed apparatus 4 (for the starting material of ultrafines), an apparatus 2 for feed of the starting fiber and recovery of the treated fiber and an ultrafines recovery section 5. The plasma torch 1 includes a quartz tube 6 (44 mm I.D.×150 mm) which is surrounded by a radio-frequency oscillation coil 7 which is in turn encircled by an outer cooling sleeve 8. At the top of the plasma torch are provided three gas outlet ports, tangential port 9, axial port 10 and radial port 11, respectively through which a gas is injected in a tangential, axial and radial directions, respectively. To each of the gas outlet ports were fed 50 liters/minute of argon from gas feed sources 12, 13 and 14, respectively. To the injecting gases was applied a radio-frequency for plasma, thus forming a plasma flame within the plasma torch. A fine particle feed port 15 (for the starting material of ultrafines) was provided at the bottom of the plasma torch. The apparatus 2 consists of a take-out bobbin 17 and a take-up bobbin 18. The chamber 3 comprises a double-walled cylinder consisting of an inner tube 19 (440 mm I.D.×1800 mm) and an outer cooling tube 20.

In practice, finely divided glass particles fed from the feed apparatus 4, carrying on 10 liter/min. of a carrier gas 16 of argon 4 were introduced at a rate of 0.5 g per minute into a high temperature plasma produced by a radio-frequency heating of an argon gas to form ultrafines of glass in a gaseous stream. Then, starting or untreated carbon fibers were taken out from the bobbin 17 at a rate of 2 m, 1 m, 0.5 m and 0.25 m per minute depending upon the degree of deposition as desired, and introduced at the bottom of the gaseous stream forming glass ultrafines, whereby the moving carbon fiber was brought into contact with glass ultrafines in the gas stream in a state wherein the ultrafines are still active and in a direction substantially perpendicular to the gas stream, thus forming the carbon fiber on the surface of which was dispersed and deposited glass ultrafines. The thus treated carbon fibers were taken up by the bobbin 18. By varying a take-up rate of the carbon fibers, there were produced the carbon fibers with different degrees of deposition.

The excess glass ultrafines were discharged from the apparatus by suction pump 22 through the ultrafines recovery section 5 having a cellulose or ceramic filter 21.

On the resultant carbon fibers ($\phi$ 7 µm) were dispersed and deposited glass ultrafines (0.01–0.1 µm, predominantly 0.05 µm), with different degrees of deposition, 8%, 25%, 60% and 90%. Those carbon fibers were subjected to a ultrasonic vibration in ethanol, but it was found that glass ultrafines were firmly deposited onto the carbon fibers with no separation therefrom.

Figure 2:
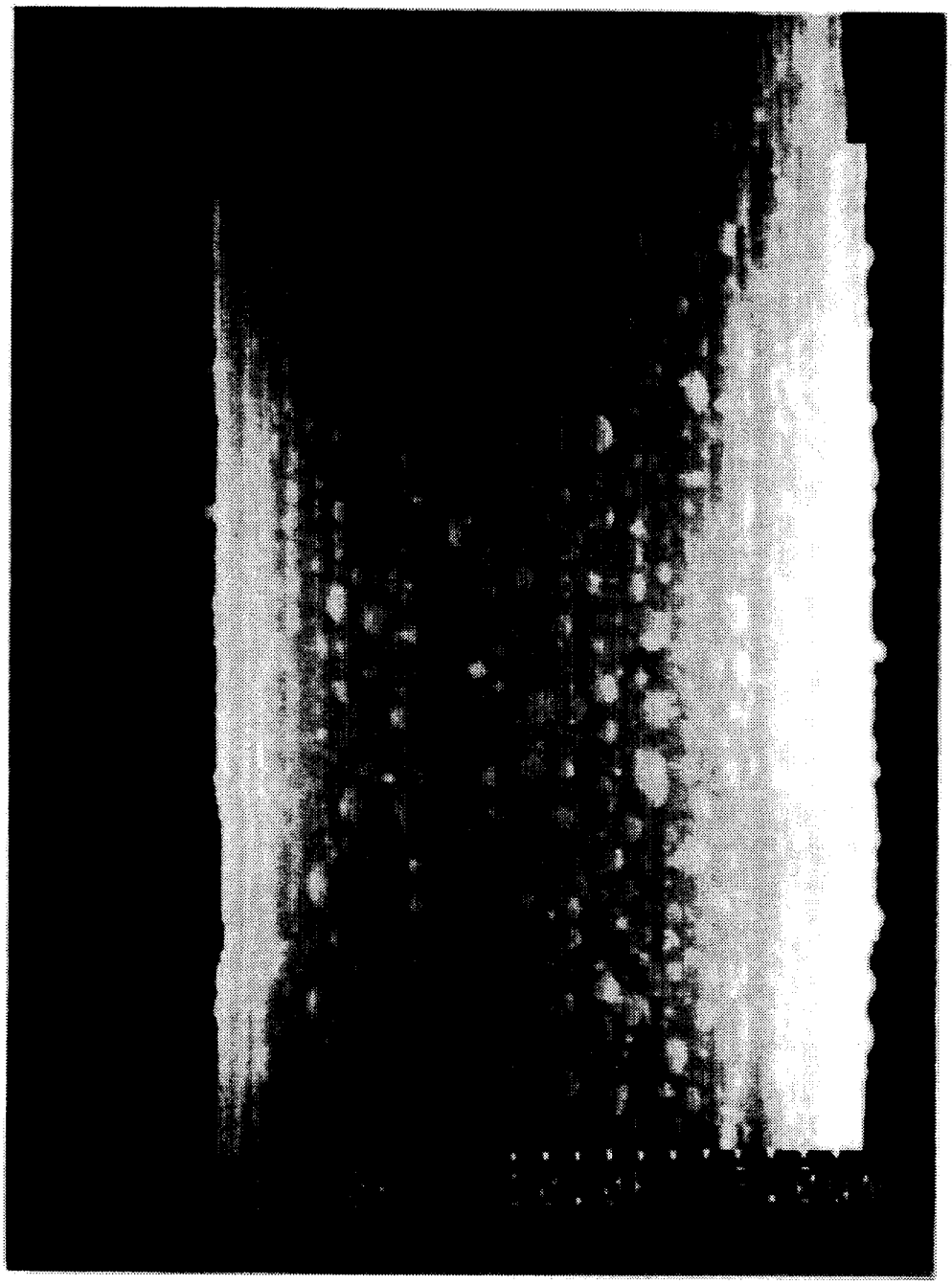
FIG. 2 is a scanning electon photomicrograph of a carbon fiber which ultrafines of glass are deposited on 25% of the surface.

A scanning electon microscopemicrograph of the carbon fiber which glass ultrafines were deposited on 25% of the surface is shown in FIG. 2.

EXAMPLE 2

This example illustrates the production of a fiber reinforced composite using the fibers treated in Example 1.

Four types of the treated carbon fibers with different degrees of surface deposition (8%, 25%, 60% and 90%) were respectively incorporated in a resin composition comprising an epoxy resin (EPICORTON, Tanabe Kagaku Kogyo KK), Castor 115 and a curing agent CA 80 to form four types of fiber reinforced resin composites each having a fiber content of 55.3% by volume.

For comparison, untreated carbon fiber was incorporated in the same resin composition as used above to form a fiber reinforced resin composite having a fiber content of 55.3%.

The composites as produced above were subjected to a three-point bending test (3.0 mm diameter, 30 mm span, 5 mm/min. test speed) using a bench type universal testing machine (Autograph AG (1 KNA) manufactured by Shimazu Manuf. Co. Ltd. ). The carbon fibers used herein are Besfight HTA-12K manufactured by Toho Rayon Co. Ltd.

The test results are shown in Table 1 wherein "Control" represents the composite comprising the untreated carbon fiber as produced for comparison and "Inventive" represents the composite comprising the treated carbon fibers each with the indicated degrees of surface deposition indicated therein.

TABLE 1

| Number of Run | Flexural Modulus of Elasticity (Kg/mm$^2$) | | | | |
|---|---|---|---|---|---|
| | Control | Inventive | | | |
| | 0% | 8% | 25% | 60% | 90% |
| 1 | 6977 | 7670 | 8283 | 7643 | 7698 |
| 2 | 7227 | 7847 | 7712 | 7972 | 7135 |
| 3 | 7142 | 7221 | 8275 | 7869 | 7289 |
| 4 | 7245 | 7615 | 7422 | 7719 | 7148 |
| 5 | 7258 | 7130 | 8094 | 7768 | 7521 |
| 6 | 7202 | 7333 | 7258 | 7747 | 7339 |
| 7 | 7208 | 7488 | 7507 | 7935 | 7442 |
| 8 | 7047 | 7554 | 7615 | 7656 | 7663 |
| 9 | 7264 | 7719 | 7558 | 7920 | 7448 |
| Average | 7174 | 7508 | 7753 | 7803 | 7443 |

Figure 3:
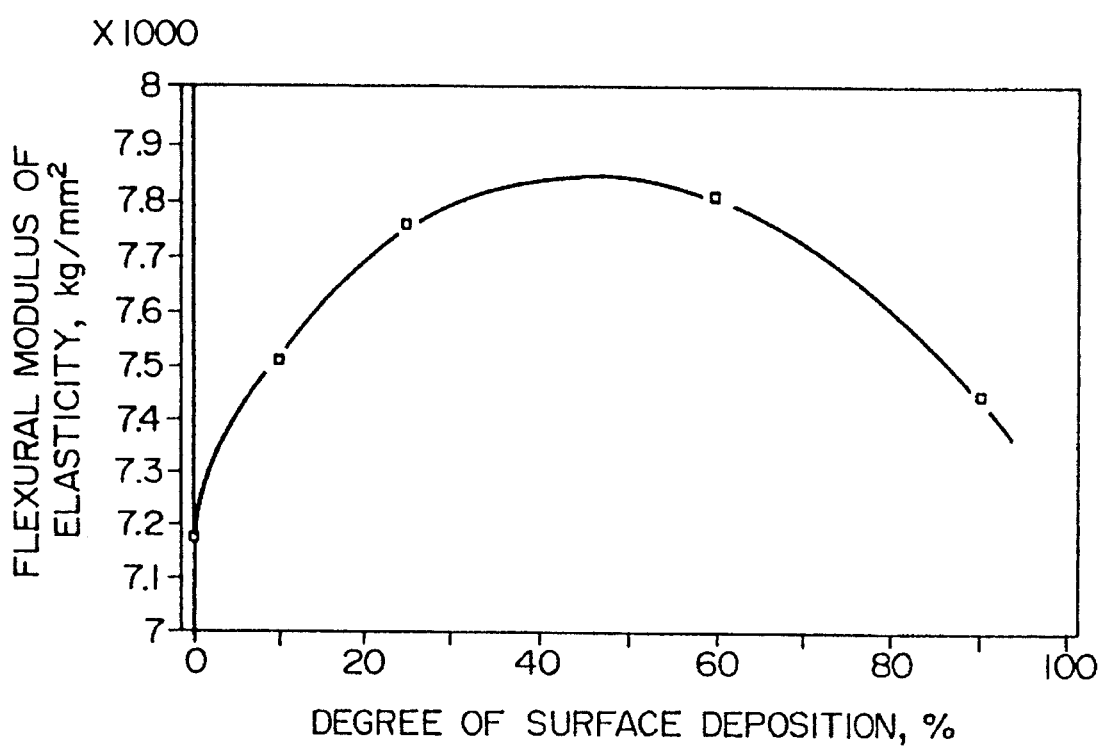
FIG. 3 is a graph showing the results in Example 2.

The data in Table 1 are plotted and shown in FIG. 3, from which it is found that the fiber reinforced composites using the carbon fibers comprising ultrafines deposited on 8–90% of the surface exhibit a remarkably improved flexural modulus of elasticity.

The process of the present invention, because of easy control of the diameter and configuration of particles enables one to have the ultrafines uniformly dispersed and deposited in a single layer on a fiber and provides better productivity as compared with the prior coating process. Further, the present process provides better micro anchor effect than the prior coating process, which results in providing improved mechanical properties when the ultrafines-deposited fiber of the invention is used as a reinforcing material for a fiber reinforced resin composite.

What is claimed is:

1. A fiber reinforced composite comprising a fiber consisting essentially of an organic, inorganic or metallic material or a simple substance wherein ultrafines of an inorganic or metallic material or a simple substance having an average particle diameter of 0.005–1 µm are uniformly dispersed and deposited on and over 8–90% of the whole surface of said fiber in a single layer, said fiber being incorporated in or coated with a thermosetting or a thermoplastic resin.

2. A composite of claim 1 wherein the thermosetting resin is unsaturated polyester, phenol-formaldehyde precondensate, epoxy resin or polyurethane.

3. A composite of claim 1 wherein the thermoplastic resin is polyethylene, polypropylene, polystyrene, polyacrylate, polymethacrylate, polyvinyl chloride, polytetrafluoroethylene, polytrifluorochloroethylene, polyisoprene, polybutadiene, SBR or natural rubber.

4. A fiber reinforced composite of claim 1, wherein the fiber is the organic material and is a polyester fiber, a polyimide fiber or a polyphenylsulfide fiber.

5. A fiber reinforced composite of claim 1, wherein the fiber is the inorganic material and is a glass fiber, asbestos, rock wool or a silicon carbide fiber.

6. A fiber reinforced composite of claim 1, wherein the fiber is the metallic material and is a fine wire or filament of Fe, Ni, Al, Ti, Au, Ag or W.

7. A fiber reinforced composite of claim 1, wherein the fiber is the simple substance is a carbon fiber.

8. A fiber reinforced composite of claim 1, wherein ultrafines are the inorganic material and are those of inorganic oxides, nitrides, carbides or borides.

9. A fiber reinforced composite of claim 8, wherein the ultrafines are inorganic oxides are glass ultrafines.

10. A fiber reinforced composite of claim 1, wherein the ultrafines are the metallic material are those of Si, Al, Co, Cu, Fe, Ti or W or intermetallic compounds and alloys thereof.

11. A fiber reinforced composite of claim 1, wherein the ultrafines are the simple substance and are those of C or B.

* * * * *

UNITED STATES PATENT AND TRADEMARK OFFICE
CERTIFICATE OF CORRECTION

PATENT NO.   : 5,541,238
DATED        : JULY 30, 1996
INVENTOR(S)  : YUKIYOSHI YAMADA ET AL.

It is certified that error appears in the above-identified patent and that said Letters Patent is hereby corrected as shown below:

Column 8, line 2, "substance is" should read
--substance and is--;
line 7, "oxides are" should read --oxides and are--;
line 9, "material are" should read
--material and are--.

Signed and Sealed this

Nineteenth Day of November, 1996

Attest:

BRUCE LEHMAN

Attesting Officer

Commissioner of Patents and Trademarks